United States Patent
Gunnarsson et al.

(10) Patent No.: US 10,517,122 B2
(45) Date of Patent: Dec. 24, 2019

(54) METHODS AND NETWORK NODES FOR MANAGING ESTABLISHMENT OF A RADIO SESSION

(71) Applicant: Telefonaktiebolaget LM Ericsson (publ), Stockholm (SE)

(72) Inventors: Fredrik Gunnarsson, Linköping (SE); Joel Berglund, Linköping (SE); Mirsad Cirkic, Linköping (SE); Henrik Rydén, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 48 days.

(21) Appl. No.: 15/758,232

(22) PCT Filed: Sep. 23, 2015

(86) PCT No.: PCT/SE2015/050993
§ 371 (c)(1),
(2) Date: Mar. 7, 2018

(87) PCT Pub. No.: WO2017/052430
PCT Pub. Date: Mar. 30, 2017

(65) Prior Publication Data
US 2018/0242376 A1    Aug. 23, 2018

(51) Int. Cl.
*H04W 76/10* (2018.01)
*H04L 1/00* (2006.01)
*H04W 24/10* (2009.01)

(52) U.S. Cl.
CPC .......... *H04W 76/10* (2018.02); *H04L 1/0003* (2013.01); *H04L 1/0009* (2013.01);
(Continued)

(58) Field of Classification Search
None
See application file for complete search history.

(56) References Cited

U.S. PATENT DOCUMENTS 9,882,676 B2 *  1/2018  Rost .................... H04W 52/386
2006/0009195 A1  1/2006  Itoh
(Continued)

FOREIGN PATENT DOCUMENTS

CN    103516495 A    1/2014
WO    2013025131 A1   2/2013
(Continued)

OTHER PUBLICATIONS

3rd Generation Partnershi Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300 V9.2.0, Dec. 2009, pp. 1-190.

*Primary Examiner* — Christopher M Crutchfield
*Assistant Examiner* — Alan L Lindenbaum
(74) *Attorney, Agent, or Firm* — Sage Patent Group

(57) ABSTRACT

A radio network node (110) manages (A010) establishment of a current radio session between a user equipment (120) and the radio network node (110), wherein the current radio session is associated with a current set of characteristics relating to the radio network node (110) and/or the user equipment (120). During establishment of the current radio session, a core network node (130) retrieves (A080), based on the current set of characteristics, an indication about the MCS offset from a memory (141, 142) accessible by the core network node (130). Then, the core network node (130) sends (A090), to the radio network node (110), the indication about the MCS offset. The indication is derived from a previous radio session, wherein the previous radio session is associated with a previous set of the characteristics, wherein the previous set of the characteristics matches the current set of the characteristics. The radio network node (120) determines (A130) a MCS based on the MCS offset and on a Channel Quality Indicator, "CQI". Furthermore, the radio (Continued)

network node (110) transmits (A140) a data packet according to the MCS. Corresponding computer program sand carriers therefor are also disclosed.

22 Claims, 8 Drawing Sheets

(52) U.S. Cl.
CPC .......... *H04L 1/0015* (2013.01); *H04L 1/0026* (2013.01); *H04W 24/10* (2013.01)

(56) References Cited

U.S. PATENT DOCUMENTS

| | | | |
|---|---|---|---|
| 2007/0066242 A1* | 3/2007 | Yi | H04L 1/0003 455/69 |
| 2013/0315153 A1 | 11/2013 | Sebeni et al. | |
| 2014/0242999 A1 | 8/2014 | Goshen et al. | |
| 2014/0321387 A1* | 10/2014 | Huang | H04W 8/26 370/329 |

FOREIGN PATENT DOCUMENTS

| WO | 2013053135 A1 | 4/2013 |
|---|---|---|
| WO | 2014072850 A2 | 5/2014 |
| WO | 2014205644 A1 | 12/2014 |
| WO | 2015068071 A1 | 5/2015 |

\* cited by examiner

METHODS AND NETWORK NODES FOR MANAGING ESTABLISHMENT OF A RADIO SESSION

TECHNICAL FIELD

Embodiments herein relate to wireless communication systems, such as cellular networks. In particular, a method and a radio network node for managing a current radio session, and a method and a core network node for assisting the radio network in managing the current radio session are disclosed. Corresponding computer programs and carriers therefor are also disclosed.

BACKGROUND

In a known wireless network, such as a telecommunication network, the User Equipment (UE) is able to estimate a quality of a received signal based on radio measurements. Since the quality of the received signal changes rapidly, it is preferred to quickly adapt modulation and coding of signals, to be sent from a Base Station (BS) to the UE, to changes in the quality of the received signal in order to benefit from the—still sufficiently accurate—radio measurements. Not only should the modulation and coding be adapted to the quality, e.g. channel conditions, but modulation and coding should additionally, or alternatively, be adapted to requirements concerning Quality Of Service (QoS) for data transmitted between the UE and the BS.

For some type of data, high throughput should be prioritized over e.g. delay. Then, for this type of data a Block Error Rate (BLER) should be set such that an average throughput it optimized, or nearly optimized. In contrast thereto, for e.g. delay sensitive data, it would be obvious to prioritize low delay over high throughput. Accordingly, the BLER should be targeted to be low BLER. In this manner, time consuming retransmissions are likely to be avoided.

In general, some Modulation and Coding Scheme (MCS) might perform better than some other MCS under a certain radio condition, e.g. quality of the received signal. It is therefore preferred to adapt the MCS to the certain radio condition, e.g. given by the quality of the received signal, to improve performance of the transmission of data. To adapt the MCS to the certain radio condition is generally referred to as link adaptation. Link adaptation means that transmission parameters, e.g. defining a specific MSC, are set depending on the radio conditions. As an example, Long Term Evolution (LTE) supports 29 different MCS, given by respective transmission parameters, where the different MCS will impact data rate of the transmission of data. A higher value of MCS implies higher data per symbol ratio than a lower value of MCS. Therefore, the higher value of MCS allows for a higher data rate as compared to the lower value of MCS. A disadvantage with setting the MCS to the high value is that the signal will be more sensitive to noise and/or interference.

In essence, link adaptation is a way to adapt to the signals transmitted, e.g. by the BS, depending on feedback, such as the measurements of quality mentioned above, from the UE. Due to a random nature of the quality of the received signals and noise at a receiver, e.g. the UE, the link adaption may not be perfect. This means that a report of the quality, e.g. from the UE to the BS, may not always create perfect link adaptation, i.e. an optical choice of MCS. The report may be given by the UE in terms of a Channel Quality Indicator (CQI) report. The CQI report may encode an observed radio condition measurement such as a Signal to Interference and Noise Ratio (SINR). Alternatively, the CQI report may encode an MCS, i.e. an estimated appropriate MCS by the UE considered to be a candidate MCS for communication to the UE.

In order to compensate for this imperfection, a so called outer loop link adaptation is typically used. The outer loop link adaptation is a method that adapts the MCS depending on acknowledgement(s) in Hybrid Automatic Repeat reQuest (HARQ) report. In LTE, the UE sends HARQ reports to the BS to request, or not request, retransmission of erroneously received data transmission(s). In outer loop link adaptation, a fixed BLER of 10% is a typical target value. This means that 90% of the data transmissions, such as transport blocks, are transmitted successfully. Note however that an effective BLER typically varies and that the target value for BLER depends on e.g. the type of data as discussed above.

As mentioned above, the link adaptation sets the MCS based on the feedback from the UE. The feedback of positive acknowledgment (ACK) messages notifies the BS of a correctly received packet and drives the MCS towards more optimistic link adaptation thresholds. On the other hand, negative acknowledgment (NACK) messages drive the offset towards more conservative link adaptation thresholds. This feedback could as explained above be misleading since randomness of the actual quality and noise at the receiver creates an uncertainty of what MCS to use at the BS. A difference between the CQI reported by the UE and a "true" CQI is defined as a CQI offset. The "true" CQI is thought of as being free from any error sources in the quality estimation performed by the UE. Some UE(s) do frequently report a bad estimate of their CQI, for example UEs with exposed to a high levels of noise.

An example illustrating the outer loop link adaptation method is depicted in FIGS. 1, 2a and 2b. In FIG. 1, an offset, such as the CQI offset, is plotted as a function of time for a first simulation and a second simulation, both with a BLER target of 10%.

In FIG. 1, an offset from the first simulation, relating to a first UE, is illustrated as a solid line and an offset from the second simulation, relating to a second UE, is illustrated as a dashed line. Both the first and second simulation illustrates adjustment of an offset directly after an establishment of a radio session, e.g. during attach for LTE.

FIG. 2a illustrates HARQ feedback received by the BS in the first simulation. As long as "Is Ack" is 1, or true, no NACK has been received. When "Is Ack" is true for a greater number of data transmissions, such as transport blocks, than expected compared to the BLER target, it may be deduced that the reported CQI is underestimated/inaccurate, and the offset is adapted accordingly. From FIG. 2a, it may be seen that, in the first simulation, the first NACK arrives after a first time period T1, e.g. 0.1 s or less. FIG. 1 shows that during this first time period T1, the CQI offset decreases. (The absolute value of the offset increases since the offset is negative in this case.) The NACK feedback received at T1 triggers an increase of the offset. The offset then turns back and forth to become relatively stable towards an—at least momentary—equilibrium (solid bold line). In this first simulation, the reported CQI is fairly accurate, i.e. the reported CQI generates a choice of MCS that is fairly close to the BLER target (within certain margins). In the first simulation, the offset becomes approximately OF1 dB, such as −0.5 dB. That is, the reported CQI is roughly OF1 dB less than the CQI which had given the target BLER directly after network establishment The second simulation shows that, during a second time period T2, e.g. 0.3 s or more, the CQI offset decreases also for the second user equipment before it goes towards a relatively stable value (dashed bold line). In this simulation, the reported CQI is misleading, i.e. the reported CQI generates a choice of MCS that does not come close to the BLER target (within certain margins). As seen in FIG. 2b, the first NACK in this simulation does not arrive until after the second time period T2. Therefore, the reported CQI is more heavily underestimated/inaccurate than in the first simulation. The offset reaches steady state at approximately OF2 dB, such as −3.5 dB, for the second simulation.

In view of the above, a problem is how to reduce time to reach steady state of offset estimation in outer loop link adaptation.

WO2013025131 discloses a method relating to handover of a mobile station from a source cell to a target cell in a cellular network. With the method initial communication between the target cell and the mobile station is improved thanks to that communication improving data between the source cell and the mobile station is collected prior to handover. The communication improving data, such as Channel Quality Indicator, Precoding Matric Indicator (PMI), power headroom etc., may thus improve communication at a new connection towards the target cell.

WO2013025131 addresses how to handle communication improving data for the case of connected mode devices during the handover. A disadvantage with WO2013025131 is that the solution is only applicable for connected mode devices.

SUMMARY

An object may be to improve performance of the above mentioned wireless network, such as a cellular network, a telecommunication network or the like.

According to an aspect, the object is achieved by a method performed by a radio network node. The radio network node manages establishment of a current radio session between a user equipment and the radio network node, wherein the current radio session is associated with a current set of characteristics relating to the radio network node and/or the user equipment. The radio network node receives, from a core network node for assisting the radio network node with the establishment of the current radio session, an indication of a MCS offset, wherein the indication is derived from a previous radio session, wherein the previous radio session is associated with a previous set of the characteristics, wherein the previous set of the characteristics matches the current set of the characteristics. Moreover, the radio network node determines a MCS based on the MCS offset and on a CQI, wherein the CQI is reported by the user equipment. Furthermore, the radio network node transmits, during the current radio session with the user equipment, a data packet according to the MCS.

According to another aspect, the object is achieved by a radio network node configured for managing establishment of a current radio session between a user equipment and the radio network node, wherein the current radio session is associated with a current set of characteristics relating to the radio network node and/or the user equipment. The radio network node is further configured for receiving, from a core network node for assisting the radio network node with the establishment of the current radio session, an indication of a MCS offset, wherein the indication is derived from a previous radio session, wherein the previous radio session is associated with a previous set of the characteristics, wherein the previous set of the characteristics matches the current set of the characteristics. Moreover, the radio network node is configured for determining a MCS based on the MCS offset and on a CQI, wherein the CQI is reported by the user equipment. Furthermore, the radio network node is configured for transmitting, during the current radio session with the user equipment, a data packet according to the MCS.

According to a further aspect, the object is achieved by a method performed by a core network node. The core network node assists a radio network node with an establishment of a current radio session between a user equipment and the radio network node. The core network node further obtains a current set of characteristics relating to the radio network node and/or the user equipment, wherein the current radio session is associated with the current set of the characteristics. Moreover, the core network node retrieves, based on the current set of characteristics, an indication about the MCS offset from a memory accessible by the core network node. Furthermore, the core network node sends, to the radio network node, the indication about the MCS offset.

According to yet another aspect, the object is achieved by acore network node is configured for assisting a radio network node with an establishment of a current radio session between a user equipment and the radio network node. The core network node is further configured for obtaining a current set of characteristics relating to the radio network node and/or the user equipment, wherein the current radio session is associated with the current set of the characteristics. Moreover, the core network node is configured for retrieving, based on the current set of characteristics, an indication about the MCS offset from a memory accessible by the core network node. Furthermore, the core network node is configured for sending, to the radio network node, the indication about the MCS offset.

According to further aspects, the object is achieved by computer programs and carriers therefor corresponding to the aspects above.

According to the embodiments herein, the radio network node receives the indication of MCS offset. Thanks to that the indication is derived from the previous radio session and that the current radio session is similar to, or matches, the previous radio session, the radio network node is able to take advantage of the indication for the previous radio session. The current and previous radio sessions match, or are similar, when the current and previous set of characteristics relating to the user equipment and/or the radio network node match, or are similar. Hence, the radio network node determines the MCS, to be used when transmitting the data packet, based on at least the MCS offset. Additionally, the MSC may be based on the reported CQI if available.

An advantage is that the current radio session is also initially adapted to the current set of characteristics for the current radio session, i.e. the current set of characteristics relating to the user equipment and/or the radio network node. This means that even just after establishment of the current radio session, the MCS offset is adapted to the current set of characteristics. A reason for this is that it is expected that the MCS offset should be the same or similar for matching, or similar, sets of characteristics. In this manner, a time period for reaching steady-state with respect to the MCS offset is reduced. A consequence of reaching steady-state with respect of the MCS offset may be higher throughput, better resources utilization, and/or shorter delay of a transmitted data packet, i.e. due to fewer HARQ-retransmissions.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
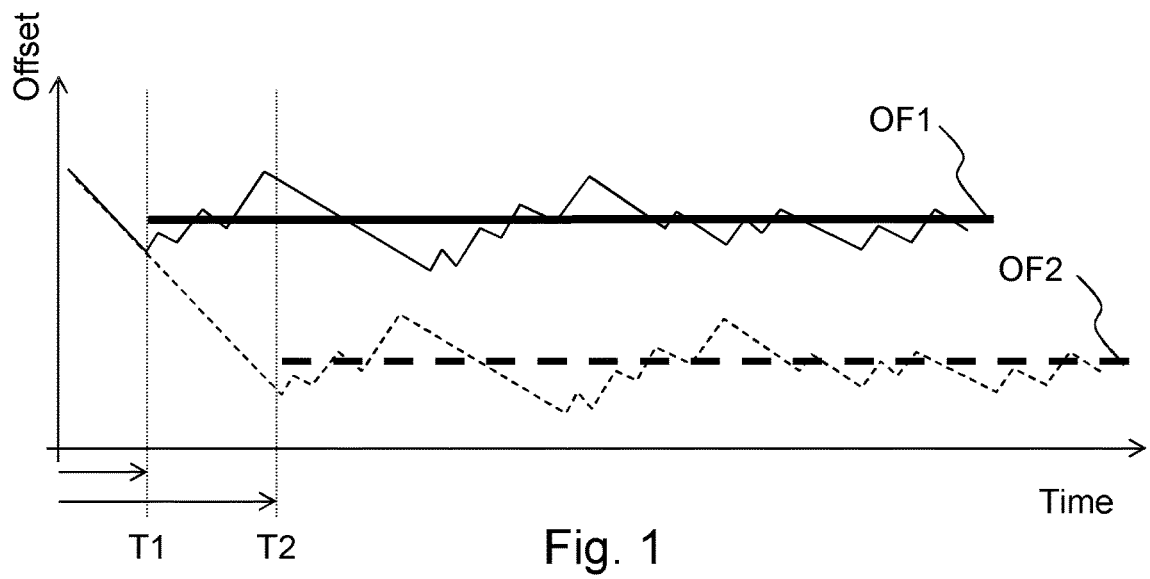
FIG. 1 is a diagram in which offset versus time is plotted.
Figure 2A:
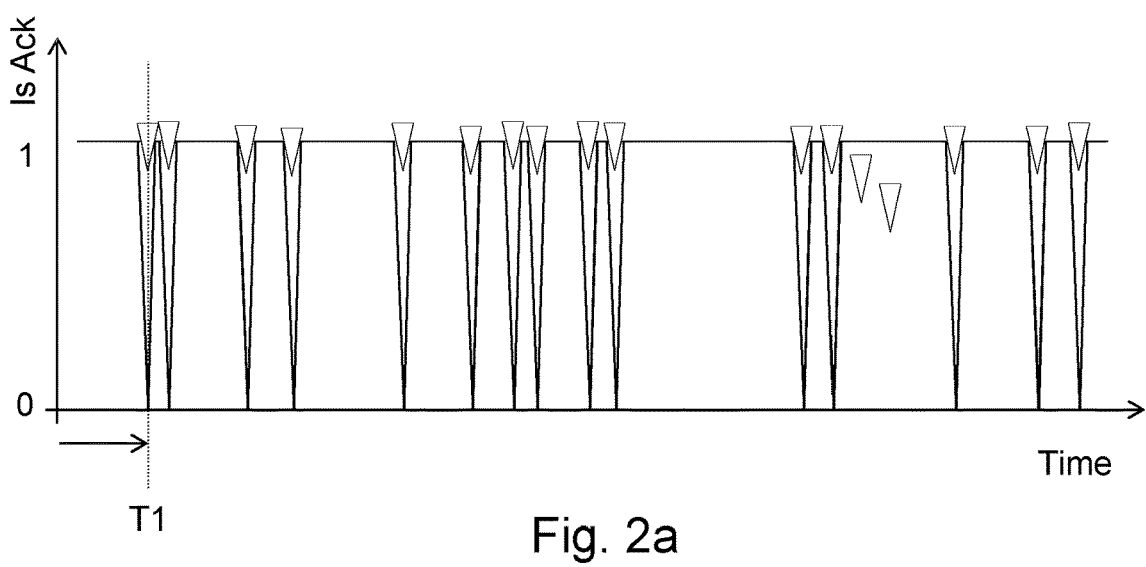
FIG. 2a is another diagram in which "Is Ack" versus time is plotted.
Figure 2B:
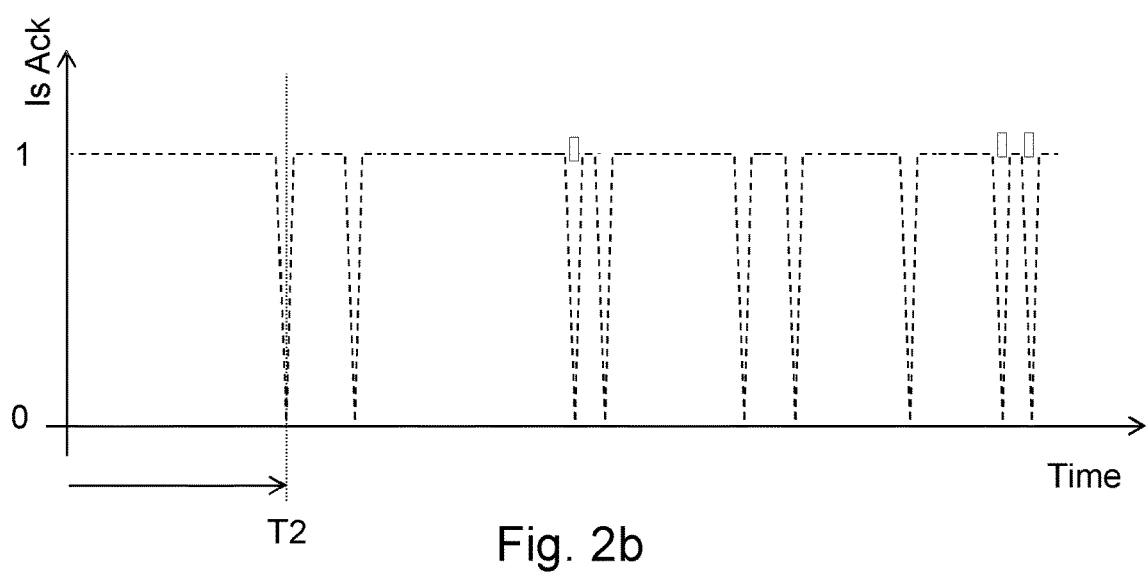
FIG. 2b is another diagram in which "Is Ack" versus time is plotted.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

In view of above mentioned WO2013025131, the following observations are made in order to better appreciate the benefits and advantages of the present solution.

Even though the solution presented in WO2013025131 works well in handover scenarios, it does not provide any improvement of performance in case the mobile station frequently attaches and detaches to the network, i.e. there is a multitude of radio sessions of relatively short duration. For each of the radio sessions, there will still be a time period during which the MCS offset stabilizes before it reaches the steady-state. Since the base station of e.g. the target cell is not aware of unique identifier for identification of the mobile station, the base station does not currently have any means of associating the multitude of radio sessions with the mobile station.

Figure 3:
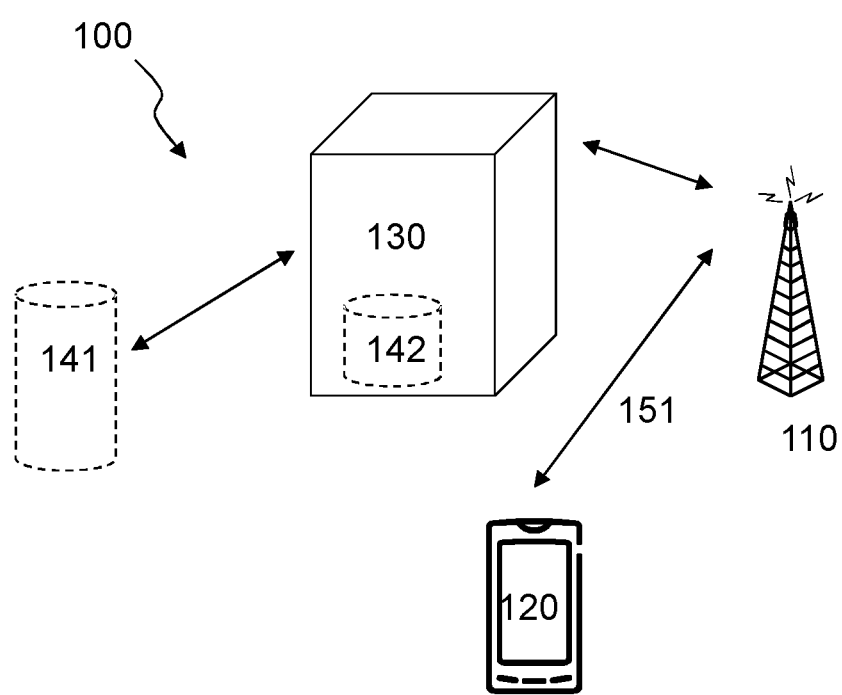
FIG. 3 is a schematic overview of an exemplifying network in which embodiments herein may be implemented.

FIG. 3 depicts an exemplifying network 100 in which embodiments herein may be implemented. In this example, the network 100 is an LTE network.

In other examples, the network 100 may be any cellular or wireless communication system, such as a network out of the Third Generation Partnership Project (3GPP) standard suits. Such as for example, a Global System for Mobile communication (GSM), Universal Mobile Telecommunication System (UMTS) and Worldwide Interoperability for Microwave Access (WiMAX) or the like.

A radio network node 110 is shown in FIG. 3. The network 100 may comprise the radio network node 110.

The network 100 may also comprise a user equipment 120. This means that the user equipment 120 is present in the network 100. Typically, the user equipment 120 is served by the radio network node 110. As an example, the user equipment 120 may be in connect mode with respect to the radio network node 110.

The network 100 may further comprise a core network node 130, such as an Mobility Management Entity (MME).

The core network node 130 is capable of accessing a memory 141, 142, such as a database. The database may be an external database 141, being external to the core network node 130, or an internal database 142, e.g. being co-located with or comprised in the core network node 130. In some examples, the external database 141 may be comprised in a Home Subscriber System (HSS), a Home Location Register (HLR), an MME or the like.

The radio network node 120 may communicate 151 with the user equipment 120. This communication may include user transmissions and/or control transmissions. The user transmissions may include user data, payload data, content data etc. The control transmissions may include control information relating to e.g. scheduling, authentication, mobility etc. The user transmissions are only relevant in case the UE is in a cellular mode. The communication may include uplink transmission and/or downlink transmission. A transmission, aka data transmission, may be referred to as a data block, such as a transport block.

As used herein, the term "radio network node" may refer to a Base Station System (BSS), a Radio Network Controller (RNC), a Radio Base Station (RBS), an evolved Node B (eNB), a control node controlling one or more Remote Radio Units (RRUs), an access point or the like.

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. Sometimes, the term "user" may be used to refer to the user equipment or the like as above. It shall be understood that the user may not necessarily involve a human user. The term "user" may also refer to a machine, a software component or the like using, or performing, certain functions, methods and similar.

As used herein, the term "radio session" may refer to a time period spanning from when the user equipment 120 attaches to the network 100 to when the user equipment 120 detaches from the network 100. As an example relating to LTE, the user equipment 120 is in RRC_CONNECTED_MODE during the radio session and has established a bearer to a core network, such as a Packet Data Gateway node.

As used herein, the term "device session" may refer to a time period spanning two or more radio sessions for one particular user equipment and/or for a user equipment being similar to said particular user equipment. The user equipment being similar to said particular user equipment may be similar in various manners as elaborated below in terms of characteristics relating to the radio network node 110 and/or the user equipment 120.

Figure 4:
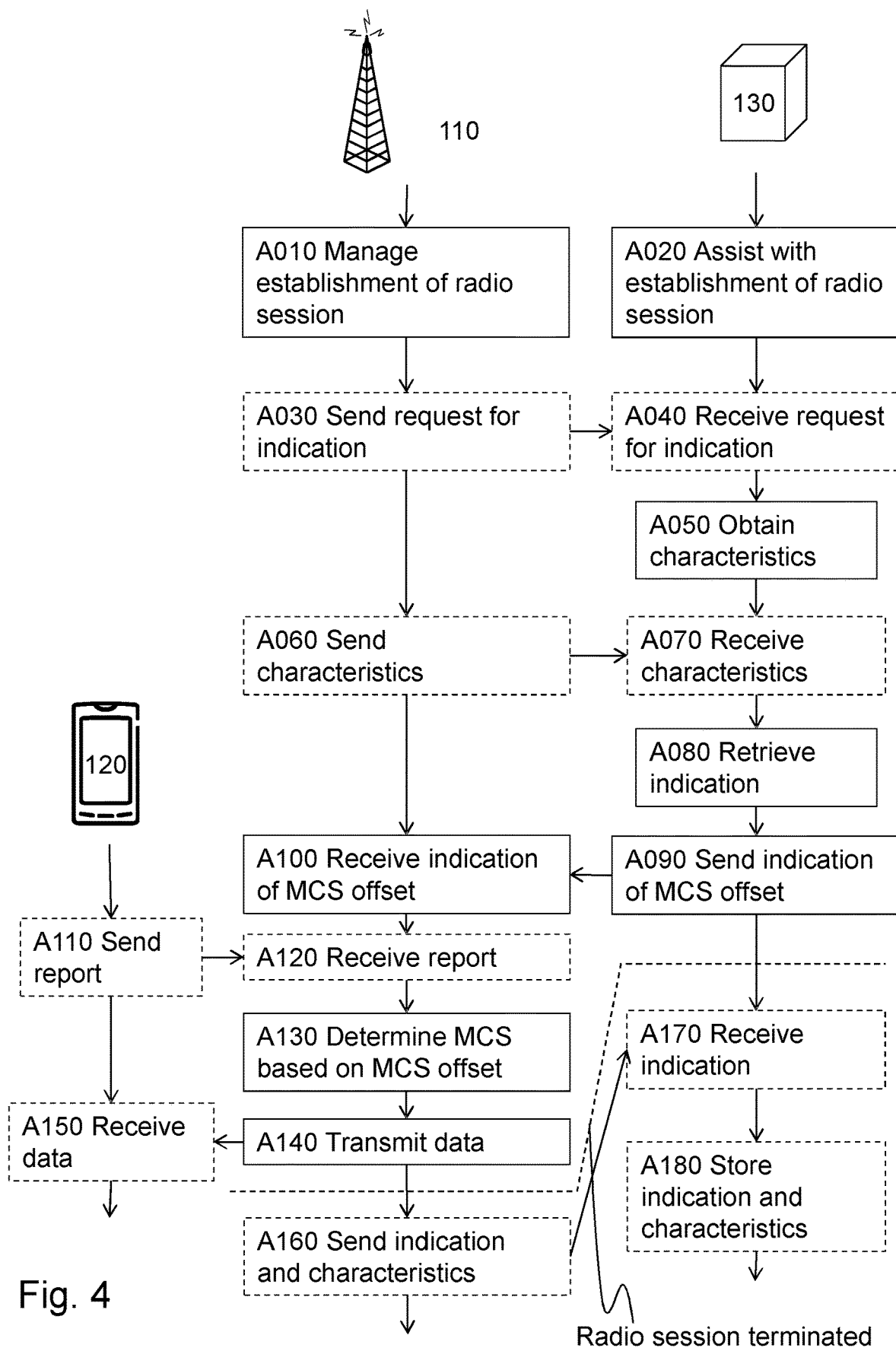
FIG. 4 is a combined signaling and flowchart illustrating the methods herein.

FIG. 4 illustrates an exemplifying method according to embodiments herein when implemented in the network 100 of FIG. 3.

One or more of the following actions may be performed in any suitable order.

Action A010

The radio network node 110 manages establishment of a current radio session between a user equipment 120 and the radio network node 110. In this manner, radio network node 110 initializes the establishment of the current radio session.

The current radio session is associated with a current set of characteristics relating to the radio network node 110 and/or the user equipment 120. The characteristics will be described in more detail below.

During establishment, typically via Non-Access-Stratum procedures, the radio network node 110 may forward information about the user equipment 120 seeking to attach to the network 100. This is information may be provided via an INITIAL UE MESSAGE over S1AP. The information may include at least a sub-set of the current set of characteristics. The information is specified in Technical Specification (TS) 36.413 S1 AP. The INITIAL UE MESSAGE includes information about identity of the accessing user equipment 120, the identity of the radio network node 110, cause of the of the current radio session.

Action A020

The core network node 130 assists the radio network node 110 with the establishment of the current radio session between the user equipment 120 and the radio network node 110.

In some examples, the core network node 130 may receive the information mentioned in action A010.

Action A030

The radio network node 110 may perform the managing A010 of the establishment of the current radio session by sending A030, to the core network node 130, a request for the indication of the MCS offset. Expressed differently, the managing A010 of the establishment of the current radio session may comprise sending, to the core network node 130, a request for the indication of the MCS offset.

This means that during the initialization of the establishment of the current radio the radio network node 110 sends the request to the core network node 130.

The request may be included an S1 AP INITIAL UE MESSAGE such as in a NAS-PDU information element, or the like.

Action A040

Subsequent to action A030, the core network node 130 may receive the request.

Action A050

The core network node 130 obtains the current set of characteristics relating to the radio network node 110 and/or the user equipment 120.

In some examples, the current set of characteristics may be received from the user equipment 120 via NAS signalling as a part of action A020.

Alternatively or additionally, the current set of characteristics may be received as in action A070.

Action A060

The radio network node 110 may send the current set of characteristics to the core network node 130.

In particular, it shall be noted that for example a type of the user equipment 120, a manufacturer of the user equipment 120, a position of the user equipment 120, a velocity of the user equipment 120, a version of baseband software of the user equipment 120, a version, a manufacturer and/or a type of radio circuitry of the user equipment 120, a type of the radio network node 110, a version of software of the radio network node 110, radio conditions for the radio network node 110 and a load of the radio network node 110 are not provided to the MME, i.e. the core network node 130, according to prior art.

Thanks to the provision of the current set of characteristics to the core network node 130, the core network node 130 may identify, e.g. as part of action A080 below, which indication about MCS offset to be sent in action A090.

Action A070

Subsequent to action A060, the core network node 130 may receive the current set of characteristics from the radio network node 110. Accordingly, as an example, the core network node 130 obtains current set of characteristics by receiving the current set of characteristics from the radio network node 110.

In some examples, the core network node 110 may already during establishment of the current radio session receive at least a portion of the current set of characteristics, such as UE service type, radio network node ID and the like.

Action A080

The core network node 130 retrieves, based on the current set of characteristics, an indication about the MCS offset from the memory 141, 142 accessible by the core network node 130. The indication about the MCS offset may be an index value indicating the MCS offset according to a predefined table. Alternatively, the indication about the MCS offset may be a value of the MCS offset to be used directly in outer loop link adaptation.

The characteristics relating to the user equipment 120 may comprise a first set of indications about one or more of:
 a type of the user equipment 120,
 a manufacturer of the user equipment 120,
 a position of the user equipment 120,
 a velocity of the user equipment 120,
 a version of baseband software of the user equipment 120,
 a version, a manufacturer and/or a type of radio circuitry of the user equipment 120,
 a type of service for the user equipment 120, and the like.

The type of the user equipment 120 may be indicated by International Mobile Equipment Identity (IMEI) or the like. The type of the user equipment 120 may also indicate the identity of the user equipment 120. Hence, based on the type of the user equipment 120, e.g. iPhone 5 or iPhone 6, the core network node 130 may deduce a number of features the user equipment 120 supports. Examples of features are different transmission modes, carrier aggregation and the like. Based on the number of features supported by the UE, given by so called UE capabilities, the core network node 130 may become aware of complexity of the user equipment 120. The retrieving the indication about the MCS offset, i.e. an initial MCS offset, may be based on the UE type, or the supported features at the UE. In general, one could expect more accurate CQI reports from a more complex UE than a low-cost UE. Therefore, based on historical data such as the previous radio session and its associated set of characteristics, one could weigh the CQI report differently for the more complex UE in comparison to the low-cost UE.

The manufacturer of the user equipment 120 may be indicated by International Mobile Equipment Identity (IMEI) or the like. As aforementioned, link adaptation is largely dependent of the CQI reports, the CQI calculation is determined by the manufacturer's implemented algorithms. The manufacturer's implemented algorithm will therefore affect accuracy of the CQI report. By retrieving the indication about MCS offset based on the UE manufacturer, one could provide different initial MCS offsets for different manufactures. For example, one could detect manufacturers that constantly, or at least frequently, report an underestimated CQI.

The position of the user equipment 120 may be retrieved via any known positioning method for telecommunication networks, Time-Of-Arrival, Observed-Time-Difference-Of-Arrival, Global Positioning System and the like. The radio and interference conditions change over a coverage area of the radio network node 110, and the selection, or retrieval, of an initial MCS offset can be based on an estimated position of the user equipment 120.

The velocity of the user equipment 120 may be indicated by a series of positions, or by a velocity estimate directly. In UE based positioning, the UE is typically capable of estimating its velocity together with the position. Many link aspects depend on the UE velocity, and therefore the selection of the initial MCS offset may depend on the UE velocity The version of baseband software of the user equipment 120 may be indicated by a NAS message to the core network node 130. Generally, the version of baseband software is available in an operating system of the UE and can thus be retrieved via the user plane.

The version, the manufacturer and/or the type of radio circuitry of the user equipment 120 may be indicated by International Mobile Equipment Identity (IMEI) or the like. The IMEI can also be used to retrieve the version of the radio circuitry.

The type of service for the user equipment 120 may be indicated by a Quality of service Class Indicator (QCI) or the like. The QCI is used to describe the service type between radio and core networks. Different service types and radio bearer quality of service classes imply different requirements on the link performance and therefore, the selection of the initial MCS offset may be based on, or depend on, the type of service for the user equipment 120.

The characteristics relating to the radio network node 110 may comprise a second set of indications about one or more of:

an identity of the radio network node 110,
a type of the radio network node 110,
a version of software of the radio network node 110,
radio conditions for the radio network node 110,
a load of the radio network node 110, and the like.

The identity of the radio network node 110 may be indicated by an S1 AP INITIAL UE MESSAGE as in prior art. The identity of the radio network node 110 represents the radio and interference conditions in the cell in an average manner, which may affect the selection of an appropriate initial MCS offset.

The type of the radio network node 110 may be indicated by a base station ID. The base station ID may be used to retrieve the radio network type from a lookup table, or by requesting the information from Operation And Maintenance (OAM) system. For example, the base station ID may belong to different ranges of IDs depending on base station type. The type of the radio network node 110 also affect the selection of an appropriate initial MCS offset. For example, the complexity of the transmitter radio chain and the antenna array configuration affect the selection of the initial MCS offset. One could therefore expect different performance based on the base station type which could then be used in the initial MCS offset selection.

The version of software of the radio network node 110 may be indicated by a base station ID. The base station ID may be used to retrieve the version of the software from a lookup table, or by requesting the information from Operation And Maintenance (OAM) system.

The radio conditions for the radio network node 110 may be indicated by Reference Signal Received Power, Reference Signal Received Quality, Received Signal Strength Indication and the like. Radio conditions can for example be measured based on received signal strength measurements with respect to serving cell and non-serving cells. The radio conditions can be gathered in histograms to represent the distribution of the radio conditions in a coverage area of a cell, operated by the radio network node 110.

The load of the radio network node 110 may be indicated by number of served user equipments, uplink link interference, time-frequency resource utilization, number of served UEs per service type, aggregated throughput in uplink or downlink. Moreover, overload indicators, such as number of fractions of failed connection establishments, failed or number of failed ongoing connections, failed or number of outgoing or incoming handovers may be used to indicate load of the radio network node 110.

The number of user equipments in nearby cells will degrade the performance by creating interference in a UEs serving cell. One could therefore expect worse channel conditions when the interference is high. Therefore, one could select the initial MCS offset based on the number of active users in adjacent cells. The historical data will be represented by interference measurements such as the number of user equipments in the adjacent cells in respect to the UE serving cell.

Additionally or alternatively, the second set of indications may relate to an indicator of the radio network node 110. The indicator may indicate whether the radio network node is capable of supporting a specific radio feature or not, for example supporting a certain number of transmitter antennas, a number of reception antennas, a certain transmission mode, etc. A transmission mode is a configuration of a specific procedure associated to data transmission or reception concerning how feedback is handled, what pilot signals are used, what different antenna combinations are supported etc. Such indicators are associated to different performance aspects of the radio links, and therefore also different offsets are appropriate.

Moreover, in some examples it may be that a power offset of pilot signals may lead to worse or improved accuracy of the measurements, such as SINR, SNR, etc as mentioned above. Therefore, the power offset may have an impact on accuracy of the estimated CQI. Even though the reported CQI is adjusted by the power offset, the CQI may also be considered less or more accurate compared to an estimation of CQI without pilots using the power offset, so called power boosted pilots.

Action A090

Now that the core network node 130 has found, i.e. retrieved, the indication that the radio network node 110 would benefit from, the core network node 130 sends the indication about the MCS offset to the radio network node 110.

The indication about the MCS offset may be included in an Initial Context Setup Request message via S1AP. Then, it may be that the indication about the MCS offset applies for all evolved Radio Access Bearers (E-RAB). In some examples, the indication about the MCS offset may apply per E-RAB, in which case the indication may be signalled in an E-RAB Setup Request or an E-RAB Modify Request message.

Action A100

The radio network node 110 receives, from the core network node 130 for assisting the radio network node 110 with the establishment of the current radio session, the indication of the MCS offset. The indication is derived from a previous radio session. The previous radio session is associated with a previous set of the characteristics. The previous set of the characteristics matches the current set of the characteristics.

Thanks to the indication, the radio network node 110 is advantageously made aware of the MCS offset during the previous radio session. The MCS offset for the previous radio session may most likely be accurate enough such that BLER is initially fulfilled, or at least fulfilled after a short period of time as compared to without knowledge of the MCS offset for the previous radio session.

The previous radio session has typically occurred prior to the current radio session.

Action A110

In order to inform the radio network node 110 about the CQI, the user equipment 120 sends a report comprising a CQI, i.e. a value of the CQI measured or determined based on a related measured quantity by the user equipment 120.

Action A120

The radio network node 110 may receive, from the user equipment 120, a report comprising a CQI. The CQI may be mapped from a measurement of Signal-to-Interference-and-Noise Ratio (SINR), or from a MCS found appropriate by the user equipment 120.

Action A130

The radio network node 110 determines a MCS based on the MCS offset and on the CQI. The CQI is reported by the user equipment 120 in action A120.

It shall here be understood that the MCS offset may be dealt with in many different manners.

As an example, the MCS offset may be given in the CQI domain, meaning that the reported CQI and the MCS offset are first added, e.g. while taking sign of values into account, to form an adjusted CQI. Then, the adjusted CQI forms the basis on which the MCS, to be used in action A160, is determined.

As another example, the MCS offset may be given in the SINR domain, meaning that a reported SINR and the MCS offset are first added, e.g. while taking sign of values into account, to form an adjusted SINR. Then, the adjusted SINR forms the basis on which the MCS, to be used in action A160, is determined.

As a further example, the MCS offset may be given in the MCS domain, meaning that reported CQI/SINR forms the basis on which an unadjusted MCS is determined. Then, the MCS offset is subtracted from the unadjusted MCS to obtain the MCS, to be used in action A160.

SINR is given as an example above. In other examples, Signal-to-Interference Ratio (SIR), Signal-to-Noise Ratio (SNR), received signal strength may be used.

Action A140

The radio network node 110 transmits, during the current radio session with the user equipment 120, a data packet according to the MCS.

Action A150

The user equipment 120 may thus receive the data packet.

At this stage, the current radio session may be terminated, or about to be terminated.

Action A160

Hence, upon termination of the current radio session or initiation of the termination of the current radio session, the radio network node 110 may send, to the core network node 130, the indication about the MCS offset.

The indication about the MCS offset may be included in an S1AP message, such as an UE CONTEXT RELEASE COMPLETE message, UE Context Release Request message or the like. Other similar messages, travelling from the radio network node 110 to the core network node 130, may also be used for carrying the indication. In case there are separate indications about MCS offsets per E-RAB, the indication about the MCS offset may be included in an E-RAB release response message.

In this manner, the radio network node 110 enables the core network node 130 to save the indication about the MCS offset. Thanks to that the core network node 130 saves the indication, the core network node 130 is able to keep track of a certain indication between several radio sessions for the same device session same device or similar device. As is described above, the same device or similar device is identified by that the device, aka the user equipment, seeking to establish the current radio session is associated with the characteristics relating to the radio network node 110 and/or the user equipment 120 that matches the previous radio session.

Action A170

Subsequent to action A160, the core network node 130 may receive the indication about the MCS offset from the radio network node 110.

Action A180

Upon receiving the indication in action A170, the core network node 130 may store the indication about the MCS offset in the memory 141,142.

The indication about the MCS offset may be associated with the current set of characteristics, or an identifier therefor.

The core network node 130 may in this manner maintain information about the indication about the MCS offset and associated characteristics. Thus, allowing the core network node 130 to later retrieve a suitable indication about the MCS offset, which matches the characteristics of a radio session to be established, such as the current radio session above.

Figure 5:
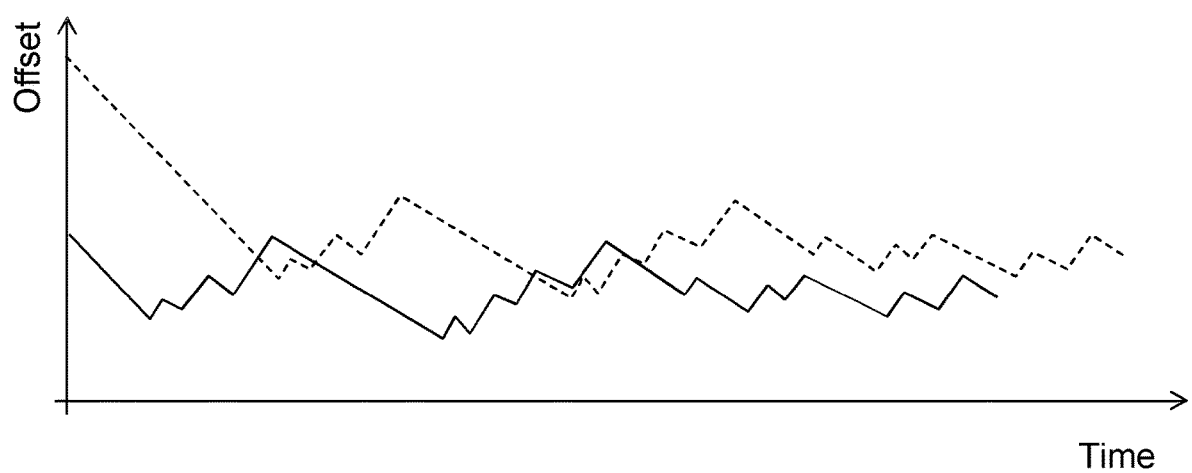
FIG. 5 is a diagram in which offset versus time is plotted.

A particular embodiment will now be described with reference to FIG. 5. Assume that a first user equipment UE 1 is represented by the dashed curve and a second user equipment UE 2 is represented by the solid curve. Furthermore, assume that UE 1 and UE 2 are having similar properties which are stored at the core network node 130, such as an MME. The similar property, e.g. the sets of characteristics may be that UE 1 and UE 2 are the same smartphone model.

First, UE 1 wishes to receive data, it then connects to the radio network node 120 which requests an initial MCS offset from the core network node 130 based on the properties of UE 1. Now, the core network node 130 contains no prior MCS offset data with the properties of UE 1. Therefore, the radio network node 110 uses the CQI report from the UE 1 and starts the outer-loop process without an initial MCS offset, or with some default initial MCS offset. After the steady state has been reached, or when UE1 releases the connection, the radio network node 110 sends the MCS offset to the core network node 130, which stores the MCS offset and its associated characteristics.

Next, UE 2 wishes to receive data, it then connects to the radio network node 110 which requests an initial MCS offset from the core network node 130. In this case, the previous radio session of UE 1 matches, or corresponds to, the current radio session of UE 2. That is to say a first model of UE 1 is the same as a second model of UE 2 (UE 1 and UE 2 is the same smartphone model as mentioned above). Therefore, the core network node 130 returns the stored MCS offset from UE 1, and the radio network node 110 initiates outer loop link adaptation for UE 2 using the obtained MCS offset. Then, the radio network node 110 transmits data, e.g. at least one data packet, to UE 2 with a link adaptation in consideration of a Channel State Information (CSI) report or a CQI report from UE2 and the initial MCS offset obtained from the core network node 130. After the outer-loop link adaptation has reached steady state for UE 2, or the connection with UE 2 is released, the radio network node 110 sends the MCS offset for UE 2 to the core network node 130. FIG. 1 illustrates how UE 2 rapidly reaches steady state thanks to the initial MCS offset retrieved from the core network node 130. It shall be noted that the initial MCS offset is in this manner learnt, or derived, from the MCS offset for UE 1.

Figure 6:
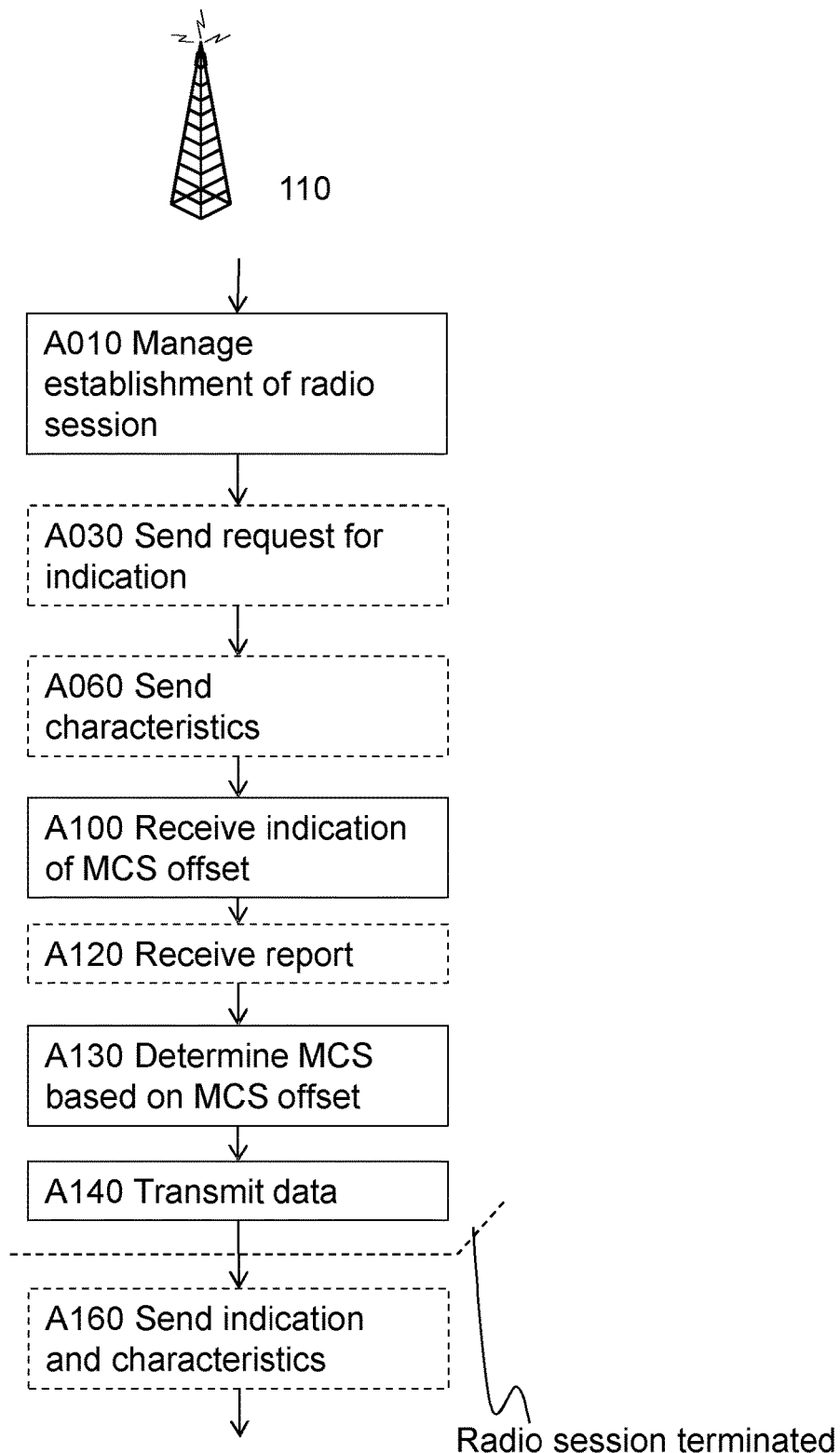
FIG. 6 is a flowchart illustrating embodiments of the method in the radio network node.

In FIG. 6, a schematic flowchart of exemplifying methods in the radio network node 110 is shown. Again, the same reference numerals as above have been used to denote the same or similar features, in particular the same reference numerals have been used to denote the same or similar actions.

One or more of the following actions may be performed in any suitable order.

Action A010

The radio network node 110 manages establishment of a current radio session between a user equipment 120 and the radio network node 110, wherein the current radio session is associated with a current set of characteristics relating to the radio network node 110 and/or the user equipment 120.

The characteristics relating to the user equipment 120 may comprise a first set of indications about one or more of:
- a type of the user equipment 120,
- a manufacturer of the user equipment 120,
- a position of the user equipment 120,
- a velocity of the user equipment 120,
- a version of baseband software of the user equipment 120,
- a version, a manufacturer and/or a type of radio circuitry of the user equipment 120,
- a type of service for the user equipment 120, and the like.

The characteristics relating to the radio network node 110 may comprise a second set of indications about one or more of:
- an identity of the radio network node 110,
- a type of the radio network node 110,
- a version of software of the radio network node 110,
- radio conditions for the radio network node 110,
- a load of the radio network node 110, and the like.

Action A030

The radio network node 110 may perform the managing A010 of the establishment of the current radio session by sending A030, to the core network node 130, a request for the indication of the MCS offset. Expressed differently, the managing A010 of the establishment of the current radio session may comprise sending, to the core network node 130, a request for the indication of the MCS offset.

Action A060

The radio network node 110 may send the current set of characteristics to the core network node 130.

Action A100

The radio network node 110 receives, from a core network node 130 for assisting the radio network node 110 with the establishment of the current radio session, an indication of a Modulation and Coding Scheme, "MCS", offset, wherein the indication is derived from a previous radio session, wherein the previous radio session is associated with a previous set of the characteristics, wherein the previous set of the characteristics matches the current set of the characteristics.

The previous radio session has typically occurred prior to the current radio session.

Action A120

The radio network node 110 may receive, from the user equipment 120, a report comprising the CQI;

Action A130

The radio network node 110 determines a MCS based on the MCS offset and on a Channel Quality Indicator, "CQI", wherein the CQI is reported by the user equipment 120.

Action A140

The radio network node 110 transmits, during the current radio session with the user equipment 120, a data packet according to the MCS.

Action A0160

The radio network node 110 may send, to the core network node 130, the indication about the MCS offset upon termination of the current radio session.

Figure 7:
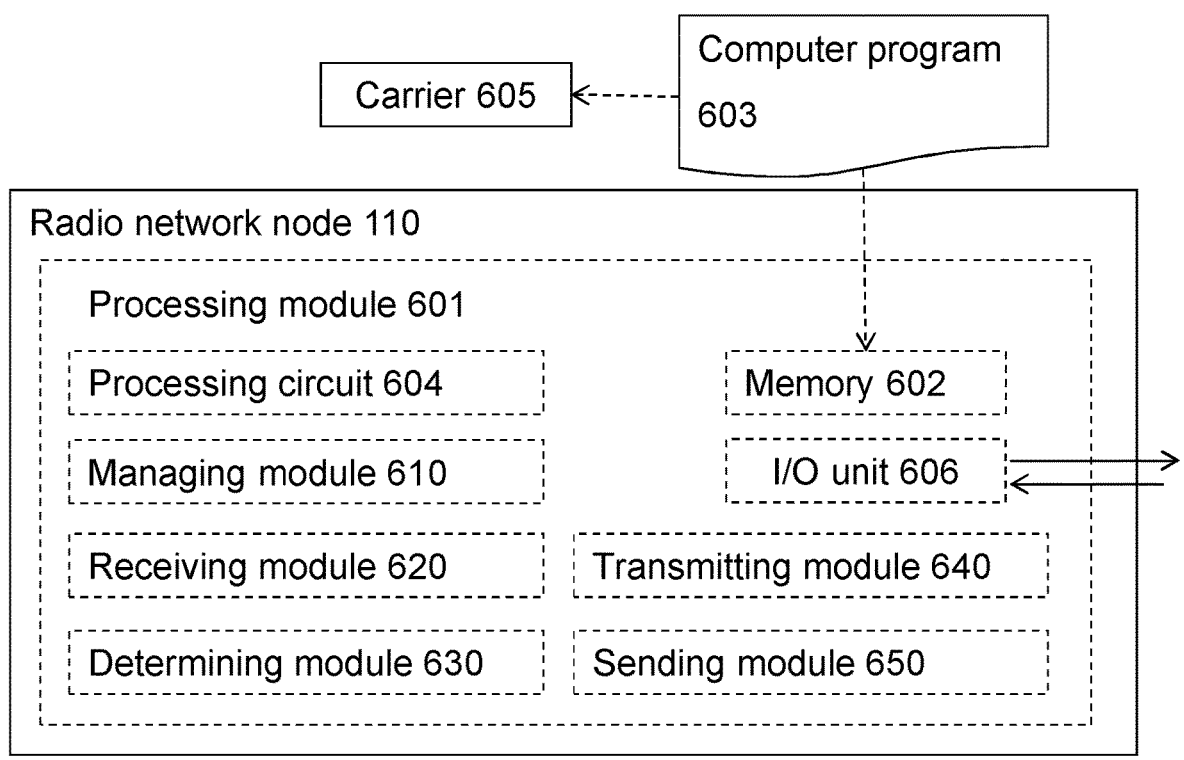
FIG. 7 is a block diagram illustrating embodiments of the radio network node.

With reference to FIG. 7, a schematic block diagram of embodiments of the radio network node 110 of FIG. 3 is shown.

The radio network node 110 may comprise a processing module 601, such as a means, one or more hardware modules and/or one or more software modules for performing the methods described herein.

The radio network node 110 may further comprise a memory 602. The memory may comprise, such as contain or store, a computer program 603.

According to some embodiments herein, the processing module 601 comprises, e.g. 'is embodied in the form of' or 'realized by', a processing circuit 604 as an exemplifying hardware module. In these embodiments, the memory 602 may comprise the computer program 603, comprising computer readable code units executable by the processing circuit 604, whereby the radio network node 110 is operative to perform the methods of FIG. 4 and/or FIG. 6.

In some other embodiments, the computer readable code units may cause the radio network node 110 to perform the method according to FIGS. 4 and/or 6 when the computer readable code units are executed by the radio network node 110.

FIG. 7 further illustrates a carrier 605, or program carrier, which comprises the computer program 603 as described directly above.

In some embodiments, the processing module 601 comprises an Input/Output unit 606, which may be exemplified by a receiving module and/or a sending module as described below when applicable.

In further embodiments, the processing module 601 may comprise one or more of a managing module 610, a receiving module 620, a determining module 630, a module transmitting 640 and a sending module 650 as exemplifying hardware modules. In other examples, one or more of the aforementioned exemplifying hardware modules may be implemented as one or more software modules.

Therefore, according to the various embodiments described above, the radio network node 110, the processing module 601 and/or the managing module 610 is configured for managing establishment of a current radio session between a user equipment 120 and the radio network node 110, wherein the current radio session is associated with a current set of characteristics relating to the radio network node 110 and/or the user equipment 120.

Moreover, the radio network node 110, the processing module 601 and/or the receiving module 620 is configured for receiving, from a core network node 130 for assisting the radio network node 110 with the establishment of the current radio session, an indication of a Modulation and Coding Scheme, "MCS", offset, wherein the indication is derived from a previous radio session, wherein the previous radio session is associated with a previous set of the characteristics, wherein the previous set of the characteristics matches the current set of the characteristics.

Furthermore, the radio network node 110, the processing module 601 and/or the determining module 630 is configured for determining a MCS based on the MCS offset and on a Channel Quality Indicator, "CQI", wherein the CQI is reported by the user equipment 120.

Additionally, the radio network node 110, the processing module 601 and/or the transmitting module 640 is configured for transmitting, during the current radio session with the user equipment 120, a data packet according to the MCS.

As mentioned, the characteristics relating to the user equipment 120 may comprise a first set of indications about one or more of:
  a type of the user equipment 120,
  a manufacturer of the user equipment 120,
  a position of the user equipment 120,
  a velocity of the user equipment 120,
  a version of baseband software of the user equipment 120,
  a version, a manufacturer and/or a type of radio circuitry of the user equipment 120,
  a type of service for the user equipment 120, and the like.

Again, the characteristics relating to the radio network node 110 may comprise a second set of indications about one or more of:
  an identity of the radio network node 110,
  a type of the radio network node 110,
  a version of software of the radio network node 110,
  radio conditions for the radio network node 110,
  a load of the radio network node 110, and the like.

The radio network node 110, the processing module 601 and/or the managing module 610 may be configured for managing the establishment of the current radio session by sending, to the core network node 130, a request for the indication of the MCS offset.

The radio network node 110, the processing module 601 and/or the sending module 650 may be configured for sending the current set of characteristics to the core network node 130.

The radio network node 110, the processing module 601 and/or the receiving module 620, or another receiving module not shown, may be configured for receiving, from the user equipment 120, a report comprising the CQI.

The radio network node 110, the processing module 601 and/or the sending module 650 may be configured for sending, to the core network node 130, the indication about the MCS offset upon termination of the current radio session.

The previous radio session has typically occurred prior to the current radio session.

Figure 8:
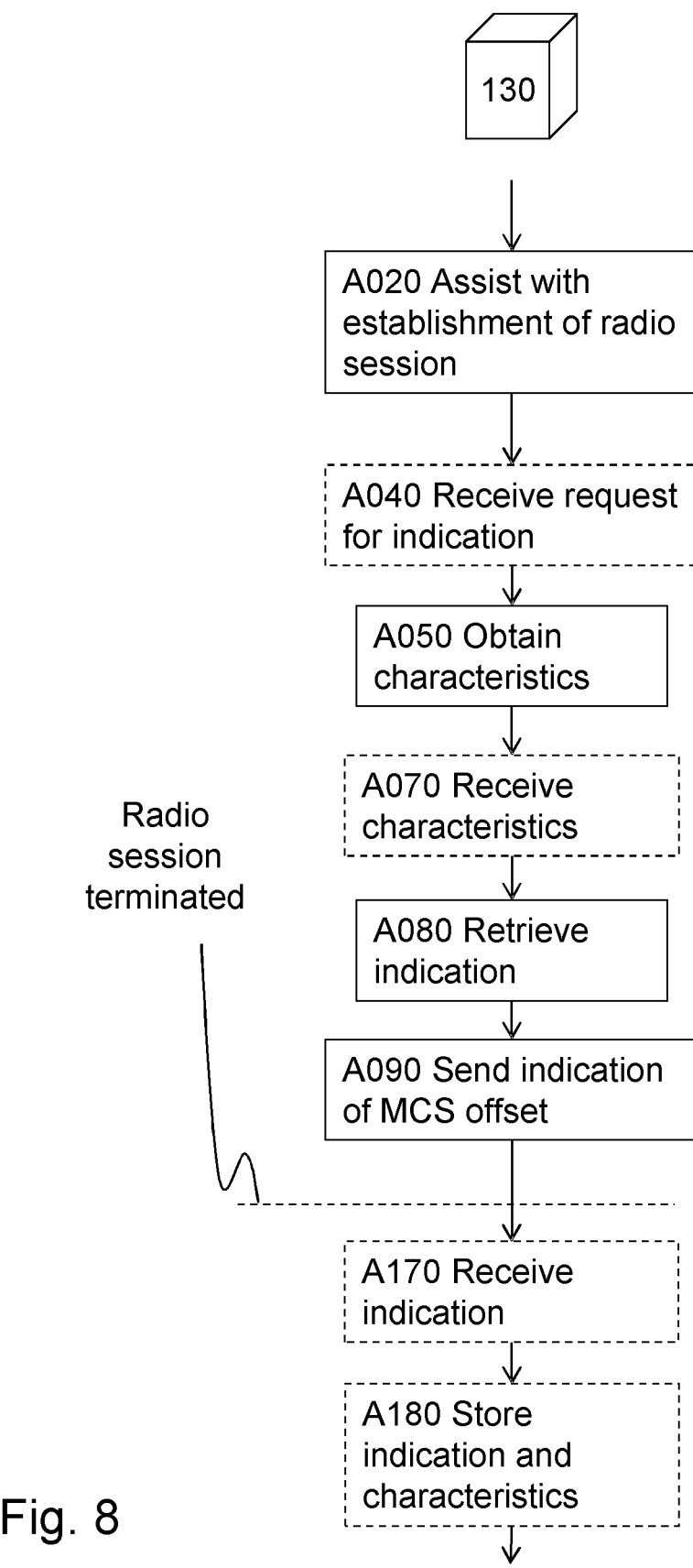
FIG. 8 is a flowchart illustrating embodiments of the method in the core network node.

In FIG. 8, a schematic flowchart of exemplifying methods in the core network node 130 is shown. Again, the same reference numerals as above have been used to denote the same or similar features, in particular the same reference numerals have been used to denote the same or similar actions.

One or more of the following actions may be performed in any suitable order.

Action A020

The core network node 130 assists a radio network node 110 with an establishment of a current radio session between a user equipment 120 and the radio network node 110.

Action A040

The core network node 130 may receive a request for an indication.

Action A050

The core network node 130 obtains a current set of characteristics relating to the radio network node 110 and/or the user equipment 120, wherein the current radio session is associated with the current set of the characteristics;

The characteristics relating to the user equipment 120 may comprise a first set of indications about one or more of:
  a type of the user equipment 120,
  a manufacturer of the user equipment 120,
  a position of the user equipment 120,
  a velocity of the user equipment 120,
  a version of baseband software of the user equipment 120,
  a version, a manufacturer and/or a type of radio circuitry of the user equipment 120,
  a type of service for the user equipment 120, and the like.

The characteristics relating to the radio network node 110 may comprise a second set of indications about one or more of:
  an identity of the radio network node 110,
  a type of the radio network node 110,
  a version of software of the radio network node 110,
  radio conditions for the radio network node 110,
  a load of the radio network node 110, and the like.

Action A070

The core network node 130 may receive the characteristics from the radio network node 110.

Action A080

The core network node 130 retrieves an indication about the MCS offset from a memory 141, 142 accessible by the core network node 130.

Action A090

The core network node 130 sends, to the radio network node 110, the indication about the MCS offset.

Action A170

The core network node 130 may receive, from the radio network node 110, the indication about the MCS offset.

Action A180

The core network node 130 may store the indication about the MCS offset in the memory 141,142.

Figure 9:
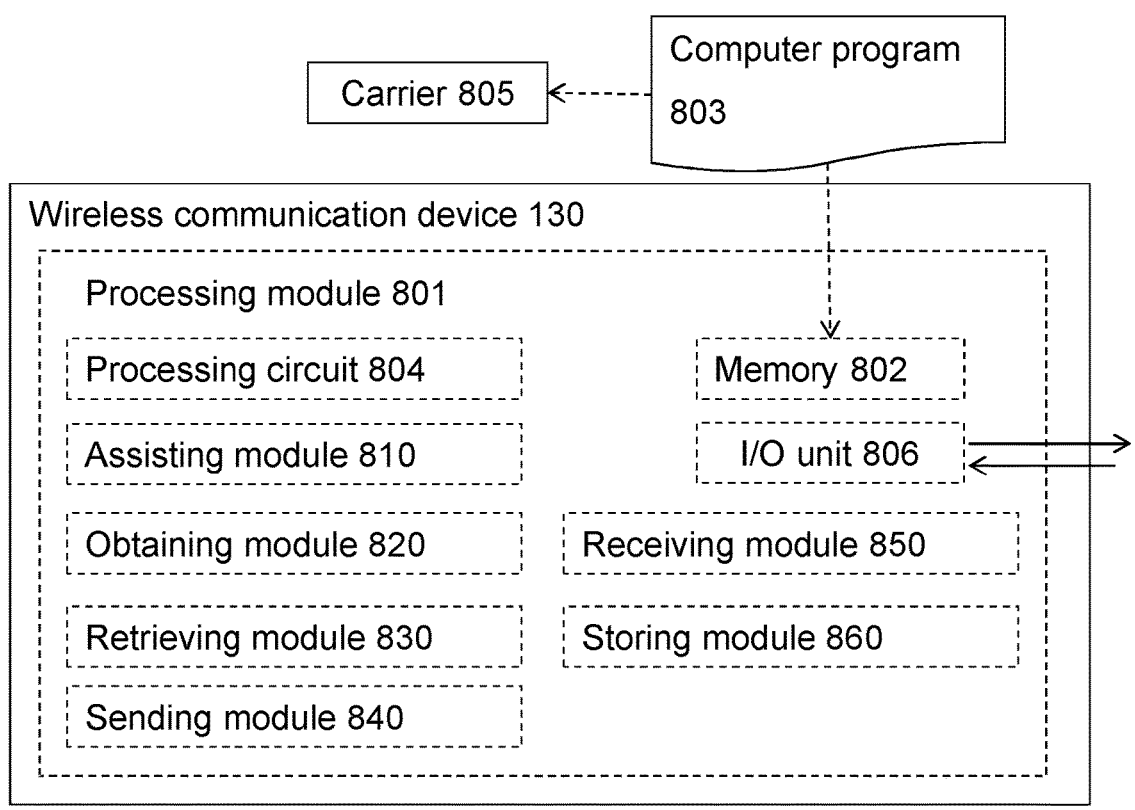
FIG. 9 is a block diagram illustrating embodiments of the core network node.

With reference to FIG. 9, a schematic block diagram of embodiments of the core network node 130 of FIG. 3 is shown.

The core network node 130 may comprise a processing module 801, such as a means, one or more hardware modules and/or one or more software modules for performing the methods described herein.

The core network node 130 may further comprise a memory 802. The memory may comprise, such as contain or store, a computer program 803.

According to some embodiments herein, the processing module 801 comprises, e.g. 'is embodied in the form of' or 'realized by', a processing circuit 804 as an exemplifying hardware module. In these embodiments, the memory 802 may comprise the computer program 803, comprising computer readable code units executable by the processing circuit 804, whereby the core network node 130 is operative to perform the methods of FIG. 4 and/or FIG. 8.

In some other embodiments, the computer readable code units may cause the core network node 130 to perform the method according to FIGS. 4 and/or 7 when the computer readable code units are executed by the core network node 130.

FIG. 9 further illustrates a carrier 805, or program carrier, which comprises the computer program 803 as described directly above.

In some embodiments, the processing module 801 comprises an Input/Output unit 806, which may be exemplified by a receiving module and/or a sending module as described below when applicable.

In further embodiments, the processing module 801 may comprise one or more of an assisting module 810, an obtaining module 820, a retrieving module 830, a sending module 840, a receiving module 850, and a storing module 860 as exemplifying hardware modules. In other examples, one or more of the aforementioned exemplifying hardware modules may be implemented as one or more software modules.

Therefore, according to the various embodiments described above, the core network node 130, the processing module 801 and/or the assisting module 810 is configured for assisting a radio network node 110 with an establishment of a current radio session between a user equipment 120 and the radio network node 110.

The core network node 130, the processing module 801 and/or the obtaining module 820 is further configured for obtaining a current set of characteristics relating to the radio network node 110 and/or the user equipment 120, wherein the current radio session is associated with the current set of the characteristics.

Moreover, the core network node 130, the processing module 801 and/or the retrieving module 830 is configured for retrieving an indication about the MCS offset from a memory 141, 142 accessible by the core network node 130.

Furthermore, the core network node 130, the processing module 801 and/or the sending module 840 is configured for sending, to the radio network node 110, the indication about the MCS offset.

As mentioned, the characteristics relating to the user equipment 120 may comprise a first set of indications about one or more of:
- a type of the user equipment 120,
- a manufacturer of the user equipment 120,
- a position of the user equipment 120,
- a velocity of the user equipment 120,
- a version of baseband software of the user equipment 120,
- a version, a manufacturer and/or a type of radio circuitry of the user equipment 120, and
- a type of service for the user equipment 120.

The characteristics relating to the radio network node 110 may comprise a second set of indications about one or more of:
- an identity of the radio network node 110,
- a type of the radio network node 110,
- a version of software of the radio network node 110,
- radio conditions for the radio network node 110, and
- a load of the radio network node 110.

The core network node 130, the processing module 801 and/or the receiving module 850 may be configured for receiving, from the radio network node 110, the indication about the MCS offset.

Additionally, the core network node 130, the processing module 801 and/or the storing module 860 is configured for storing the indication about the MCS offset in the memory 141,142.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, comprising a radio network node:
   managing establishment of a current radio session between a user equipment and the radio network node, wherein the current radio session is associated with a current set of characteristics relating to the radio network node and/or the user equipment;
   receiving, from a core network node for assisting the radio network node with the establishment of the current radio session, an indication of a Modulation and Coding Scheme (MCS) offset, wherein the indication is derived from a previous radio session, wherein the previous radio session is associated with a previous set of the characteristics, wherein the previous set of the characteristics matches the current set of the characteristics;
   determining a MCS based on the MCS offset and on a Channel Quality Indicator (CQI), wherein the CQI is reported by the user equipment;
   transmitting, during the current radio session with the user equipment, a data packet according to the MCS; and
   sending, to the core network node, the indication about the MCS offset upon termination of the current radio session.

2. The method of claim 1, wherein the characteristics relating to the user equipment comprises a first set of indications about one or more of:
   a type of the user equipment;
   a manufacturer of the user equipment;
   a position of the user equipment;
   a velocity of the user equipment;
   a version of baseband software of the user equipment;
   a version, a manufacturer, and/or a type of radio circuitry of the user equipment; and
   a type of service for the user equipment.

3. The method of claim 1, wherein the characteristics relating to the radio network node comprises a second set of indications about one or more of:
   an identity of the radio network node;
   a type of the radio network node;
   a version of software of the radio network node;
   radio conditions for the radio network node; and
   a load of the radio network node.

4. The method of claim 1, wherein the managing the establishment of the current radio session comprises sending, to the core network node, a request for the indication of the MCS offset.

5. The method of claim 1, further comprising the radio network node sending the current set of characteristics to the core network node.

6. The method claim 1, further comprising the radio network node receiving, from the user equipment, a report comprising the CQI.

7. The method of claim 1, wherein the previous radio session has occurred prior to the current radio session.

8. A radio network node, comprising:
   processing circuitry;
   memory containing instructions executable by the processing circuitry whereby the radio network node is operative to:
      manage establishment of a current radio session between a user equipment and the radio network node, wherein the current radio session is associated with a current set of characteristics relating to the radio network node and/or the user equipment;
      receive, from a core network node for assisting the radio network node with the establishment of the current radio session, an indication of a Modulation and Coding Scheme (MCS) offset, wherein the indication is derived from a previous radio session, wherein the previous radio session is associated with a previous set of the characteristics, wherein the previous set of the characteristics matches the current set of the characteristics;
      determine a MCS based on the MCS offset and on a Channel Quality Indicator (CQI), wherein the CQI is reported by the user equipment;
      transmit, during the current radio session with the user equipment, a data packet according to the MCS; and
      send, to the core network node, the indication about the MCS offset upon termination of the current radio session.

9. The radio network node of claim 8, wherein the characteristics relating to the user equipment comprises a first set of indications about one or more of:
   a type of the user equipment;
   a manufacturer of the user equipment;
   a position of the user equipment;
   a velocity of the user equipment;
   a version of baseband software of the user equipment;
   a version, a manufacturer, and/or a type of radio circuitry of the user equipment; and
   a type of service for the user equipment.

10. The radio network node of claim 8, wherein the characteristics relating to the radio network node comprises a second set of indications about one or more of:
   an identity of the radio network node;
   a type of the radio network node;

a version of software of the radio network node;
radio conditions for the radio network node; and
a load of the radio network node.

11. The radio network node of claim 8, wherein the instructions are such that the radio network node is operative to manage the establishment of the current radio session by sending, to the core network node, a request for the indication of the MCS offset.

12. The radio network node of claim 8, wherein the instructions are such that the radio network node is operative to send the current set of characteristics to the core network node.

13. The radio network node of claim 8, wherein the instructions are such that the radio network node is operative to receive, from the user equipment, a report comprising the CQI.

14. The radio network node of claim 8, wherein the previous radio session has occurred prior to the current radio session.

15. A method, comprising a core network node:
assisting a radio network node with an establishment of a current radio session between a user equipment and the radio network node;
obtaining a current set of characteristics relating to the radio network node and/or the user equipment, wherein the current radio session is associated with the current set of the characteristics;
retrieving, based on the current set of characteristics, an indication about a Modulation and Coding Scheme (MCS) offset from memory accessible by the core network node;
sending, to the radio network node, the indication about the MCS offset;
receiving, from the radio network node, the indication about the MCS offset; and
storing the indication about the MCS offset in the memory.

16. The method of claim 15, wherein the characteristics relating to the user equipment comprises a first set of indications about one or more of:
a type of the user equipment;
a manufacturer of the user equipment;
a position of the user equipment;
a velocity of the user equipment;
a version of baseband software of the user equipment;
a version, a manufacturer, and/or a type of radio circuitry of the user equipment; and
a type of service for the user equipment.

17. The method of claim 15, wherein the characteristics relating to the radio network node comprises a second set of indications about one or more of:
an identity of the radio network node;
a type of the radio network node;
a version of software of the radio network node;
radio conditions for the radio network node; and
a load of the radio network node.

18. A core network node, comprising:
processing circuitry;
memory containing instructions executable by the processing circuitry whereby the core network node is operative to:
assist a radio network node with an establishment of a current radio session between a user equipment and the radio network node;
obtain a current set of characteristics relating to the radio network node and/or the user equipment, wherein the current radio session is associated with the current set of the characteristics;
retrieve an indication about a Modulation and Coding Scheme (MCS) offset from memory accessible by the core network node;
send, to the radio network node, the indication about the MCS offset;
receive, from the radio network node, the indication about the MCS offset; and
store the indication about the MCS offset in the memory.

19. The core network node of claim 18, wherein the characteristics relating to the user equipment comprises a first set of indications about one or more of:
a type of the user equipment;
a manufacturer of the user equipment;
a position of the user equipment;
a velocity of the user equipment;
a version of baseband software of the user equipment;
a version, a manufacturer, and/or a type of radio circuitry of the user equipment; and
a type of service for the user equipment.

20. The core network node of claim 18, wherein the characteristics relating to the radio network node comprises a second set of indications about one or more of:
an identity of the radio network node;
a type of the radio network node;
a version of software of the radio network node;
radio conditions for the radio network node; and
a load of the radio network node.

21. A non-transitory computer readable recording medium storing a computer program product for controlling a radio network node, the computer program product comprising software instructions which, when run on processing circuitry of the radio network node, causes the radio network node to:
manage establishment of a current radio session between a user equipment and the radio network node, wherein the current radio session is associated with a current set of characteristics relating to the radio network node and/or the user equipment;
receive, from a core network node for assisting the radio network node with the establishment of the current radio session, an indication of a Modulation and Coding Scheme (MCS) offset, wherein the indication is derived from a previous radio session, wherein the previous radio session is associated with a previous set of the characteristics, wherein the previous set of the characteristics matches the current set of the characteristics;
determine a MCS based on the MCS offset and on a Channel Quality Indicator (CQI), wherein the CQI is reported by the user equipment;
transmit, during the current radio session with the user equipment, a data packet according to the MCS; and
send, to the core network node, the indication about the MCS offset upon termination of the current radio session.

22. A non-transitory computer readable recording medium storing a computer program product for controlling a core network node, the computer program product comprising software instructions which, when run on processing circuitry of the core network node, causes the core network node to:
assist a radio network node with an establishment of a current radio session between a user equipment and the radio network node;

obtain a current set of characteristics relating to the radio network node and/or the user equipment, wherein the current radio session is associated with the current set of the characteristics;
retrieve, based on the current set of characteristics, an indication about a Modulation and Coding Scheme (MCS) offset from memory accessible by the core network node;
send, to the radio network node, the indication about the MCS offset;
receive, from the radio network node, the indication about the MCS offset; and
store the indication about the MCS offset in the memory.

* * * * *